May 31, 1938.   F. F. KULL ET AL   2,119,462
SOLDERING IRON
Filed May 17, 1937
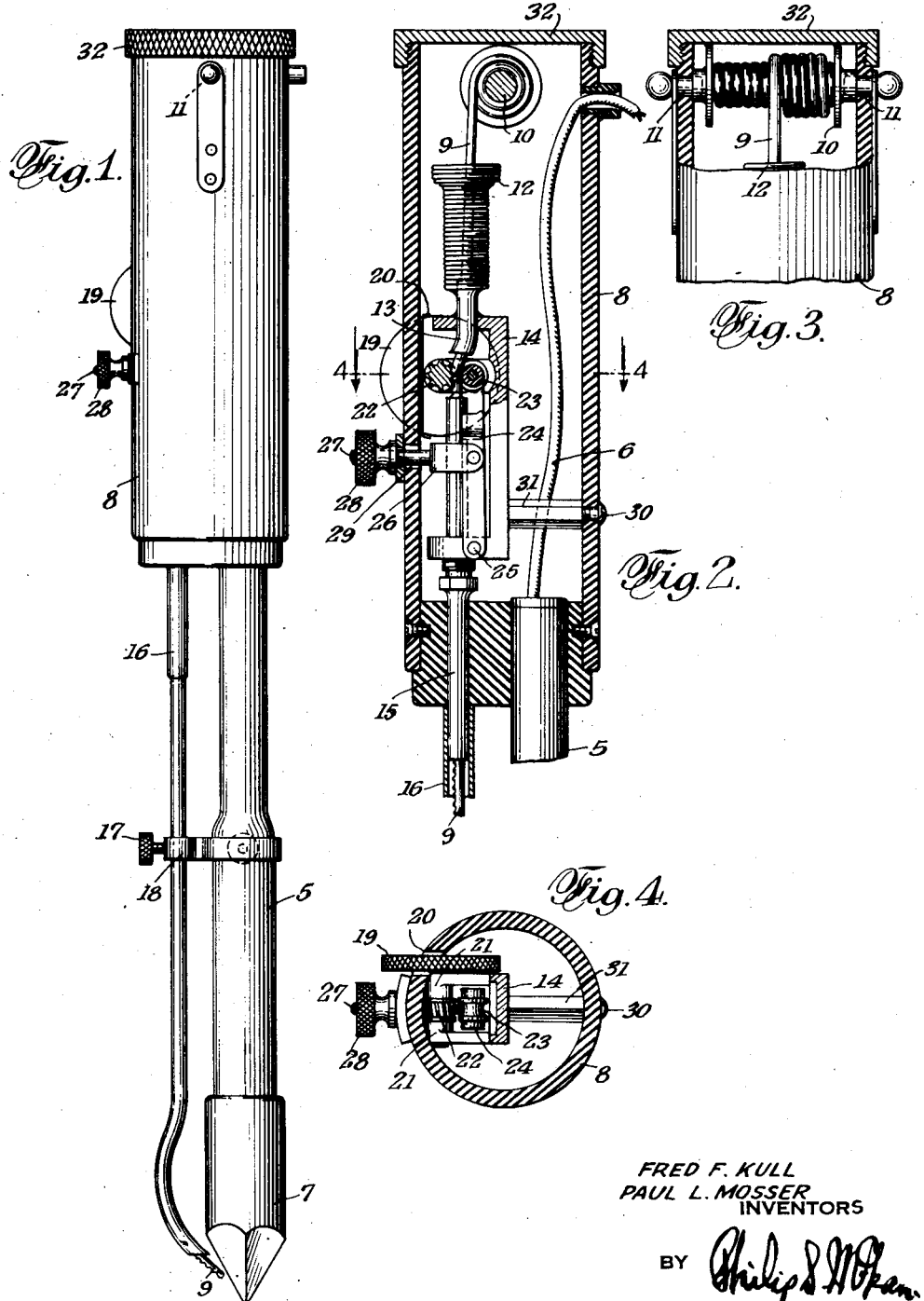
FRED F. KULL
PAUL L. MOSSER
INVENTORS
BY
ATTORNEY Patented May 31, 1938

2,119,462

UNITED STATES PATENT OFFICE 2,119,462

SOLDERING IRON

Fred F. Kull, Astoria, and Paul L. Mosser, North Jackson Heights, N. Y.

Application May 17, 1937, Serial No. 143,058

3 Claims. (Cl. 113—109)

The invention which is here disclosed and claimed relates to the general subject of soldering irons.

Objects of the invention are to so co-relate the iron and the solder which it uses that a supply of the solder may be carried by the iron and be advanced as required to the heated tip of the iron.

It is intended to provide the supply of solder in such form that it may readily be placed in the iron.

Further objects are to provide solder feeding mechanism in the form of a unit readily applicable to existing soldering irons of the self heated type.

Various other objects and the novel features of construction, combinations and relations of parts comprising the invention are hereafter set forth or will appear in the course of the following specification.

The drawing accompanying and forming part of the specification illustrates one of the practical embodiments of the invention. Such illustration however is primarily for purposes of disclosure and it should be understood that many changes in structure may be made all within the true intent and broad scope of the claims.

Fig. 1 is a side elevation of a commercial embodiment of the invention.

Fig. 2 is a broken longitudinal sectional view of the same on an enlarged scale.

Fig. 3 is a broken part sectional detail showing the mounting of the replaceable spool solder.

Fig. 4 is a cross-sectional view as on the plane of line 4—4 of Fig. 2.

In the drawing, there is shown a typical design of electrically heated soldering iron having a tubular shank portion 5, through which the wiring 6, conducts current to the heating element in the tip or point 7, of the iron.

In place of the handle, which is usually provided on the hollow shank or stem 5, there is substituted in the present disclosure, a tubular casing 8, which need be but slightly, if any, larger than the usual handle and which in addition to serving as a container for the solder and solder feeding mechanism, also serves as a true handle for the iron.

In the sectional views, Figs. 2 and 3, the solder is indicated at 9, on a spool 10, removably journalled in the outer end of the handle casing on spring thrust pins 11.

The solder passes from the spool 10, into the belled end of a flexible tubular coiled spring guide 12, on the end of a rigid tubular guide 13, fixed in the end of a bracket or frame member 14. In the opposite end of this frame member and substantially in line with the rigid guide tube 13, is a second guide tube 15, shown as projecting through the inner end of the handle casing 8 into position to receive or coact with an external guide tube 16, removably clamped by screw 17, in a bracket 18, on the shank of the iron and terminating in an inwardly angled end for directing the end of the solder against the tip of the iron.

Means for effecting the feed of the solder are shown in the form of a thumb wheel 19, projecting through a slot 20, in the side of the casing, said wheel being journalled in bearings 21, in the frame 14, and having a toothed wheel portion 22, in engagement with the solder at a point between the adjoining ends of guide tubes 13, 15.

To hold the solder in proper engagement with the feed wheel 22, there is shown a roller 23, journalled in the arms of a yoke 24, pivoted on the frame at 25, and engaged by a pivotally connected yoke 26, provided with a screw stem 27, projecting through the side of the casing and having upon it an adjusting nut 28, which can be turned to bear against the casing to swing the yoke 24, outward to cause roll 23, to hold the solder strip firmly against the feed wheel.

The frame carrying the solder guides and feed mechanism is shown as positioned, supported and removably secured within the handle casing by having the lower guide 15, project through the end of the handle, the thumb wheel 19, project through the slot 20, the screw stem 27, project through opening 29, in one side of the casing and by the provision of a securing screw 30, projecting through the opposite side of the casing, through an interposed spacing sleeve 31, and into the back portion of the frame 14.

In operation, with the solder strip in place, as shown, it is only necessary to turn the thumb wheel 19, to advance as much or as little solder as required, direct to the tip of the iron. If desired, the solder which is not immediately required may be retracted away from the hot tip by turning the thumb wheel in the reverse direction. The spacing of the guide tube 16, is far enough away from the tip to prevent melting of the solder in the guide. If there is any slippage in feeding, this can be instantly corrected by tightening the adjusting screw 28, which draws the supporting roller 23, toward the feed roller 22. When the solder on one spool is all used up, the short length remaining in guide tubes 15, 16, may be pulled out at the tip end of the guide. If any difficulty is experienced in this, the screw 17, may be loosened to release the external guide tube 16, which can then be disconnected from the internal guide tube 15, to give full access to the solder strip.

Fresh spools of solder can quickly be placed in the tool upon removing the end screw cap 32, of the handle, taking out the empty spool and replacing the latter with a full spool. In making such replacement, the end of the solder is simply advanced through the flexible coiled guide 12, and through fixed guide tube 13, into position between the feed roll and backing roll. At such time, the screw 28, is preferably loosened to provide space between the rolls for the solder to pass on into the second fixed guide 15, whereupon the screw may be tightened to clamp the strip between the rolls. Then any movement of the feed roll will advance the strip as desired. The flexibility of the coiled guide 12, and the flaring bell mouth enable this guide to follow the unwinding action of the solder and to guide it properly at all times into the fixed tube 13. This construction also is of an advantage in backing up the solder to an extent permitting the guide to swing one way or another, as the solder may widen more or less in a loop on being forced back toward the spool.

The parts of the device are all relatively simple, durable and low in cost, rendering the mechanism particularly suitable for soldering irons of present design.

What is claimed is:

1. In combination with a soldering iron having a heated point and a tubular handle casing, means for mounting a supply of solder strip in the end of the handle casing, separated but substantially aligned rigid guides for the solder strip, solder gripping and feeding means between the separated portions of the fixed guides, a flexible guide between the supply of solder and the first fixed guide and a disconnectible guide extending from the second fixed guide to a point adjacent the heated point of the soldering iron and in which the separated fixed guides, the flexible tubular guide and the feed means are all mounted in a single frame and releasable means are provided for detachably securing said frame within the handle casing.

2. In combination with a soldering iron having a heated point and a tubular handle casing, means for mounting a supply of solder strip in the end of the handle casing, separated but substantially aligned rigid guides for the solder strip, solder gripping and feeding means between the separated portions of the fixed guides, a flexible guide between the supply of solder and the first fixed guide and a disconnectible guide extending from the second fixed guide to a point adjacent the heated point of the soldering iron and in which the feed means comprises cooperating feed and backing rolls and in which one of said rolls is mounted in a swinging support provided with screw means accessible at the outside of the handle casing for shifting said swinging support.

3. In combination with a soldering iron having a heated point and a tubular handle casing, means for mounting a supply of solder strip in the end of the handle casing, separated but substantially aligned rigid guides for the solder strip, solder gripping and feeding means between the separated portions of the fixed guides, a flexible guide between the supply of solder and the first fixed guide and a disconnectible guide extending from the second fixed guide to a point adjacent the heated point of the soldering iron and in which said spaced fixed guides project from opposite ends of a frame in which the feed means is mounted and in which screw means extend through the handle casing for securing said frame removably in position in the casing.

FRED F. KULL.
PAUL L. MOSSER.